June 3, 1952  W. P. OSGOOD  2,599,278
SUPPORTING MEANS FOR ROLLER IDENTIFICATION DEVICES
Filed Oct. 29, 1947  6 Sheets-Sheet 1
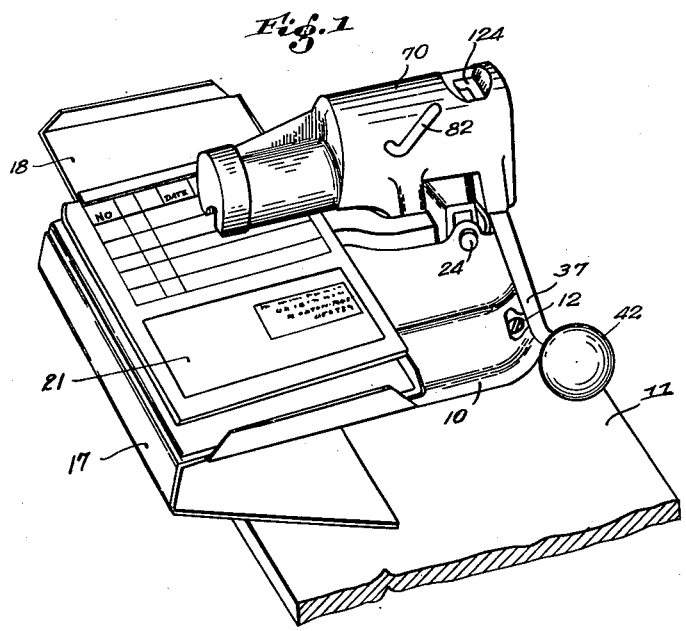
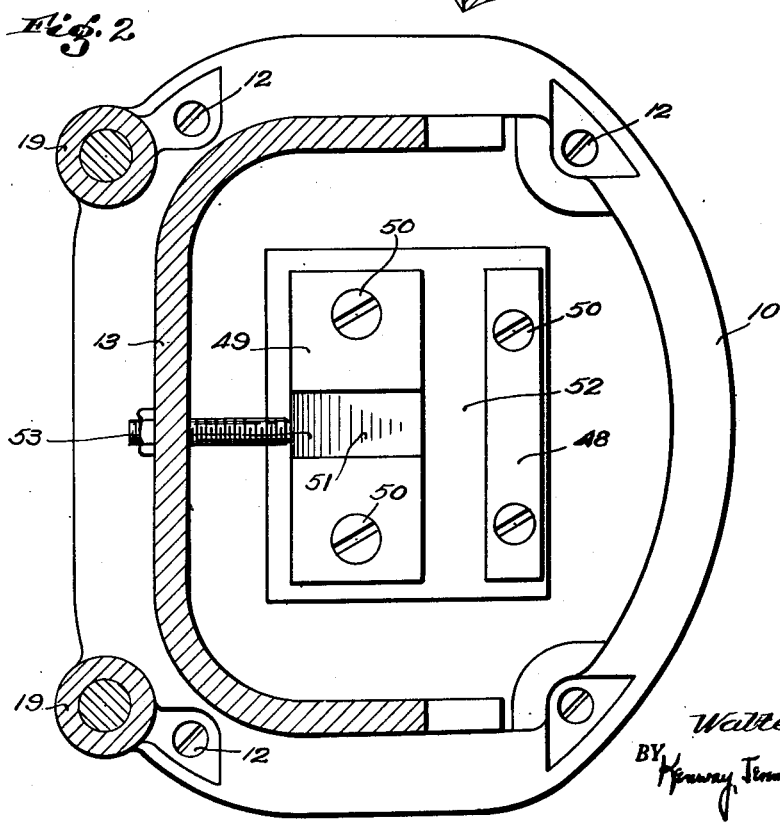
INVENTOR.
Walter P. Osgood,
BY
his Attys.

June 3, 1952    W. P. OSGOOD    2,599,278
SUPPORTING MEANS FOR ROLLER IDENTIFICATION DEVICES
Filed Oct. 29, 1947    6 Sheets-Sheet 2
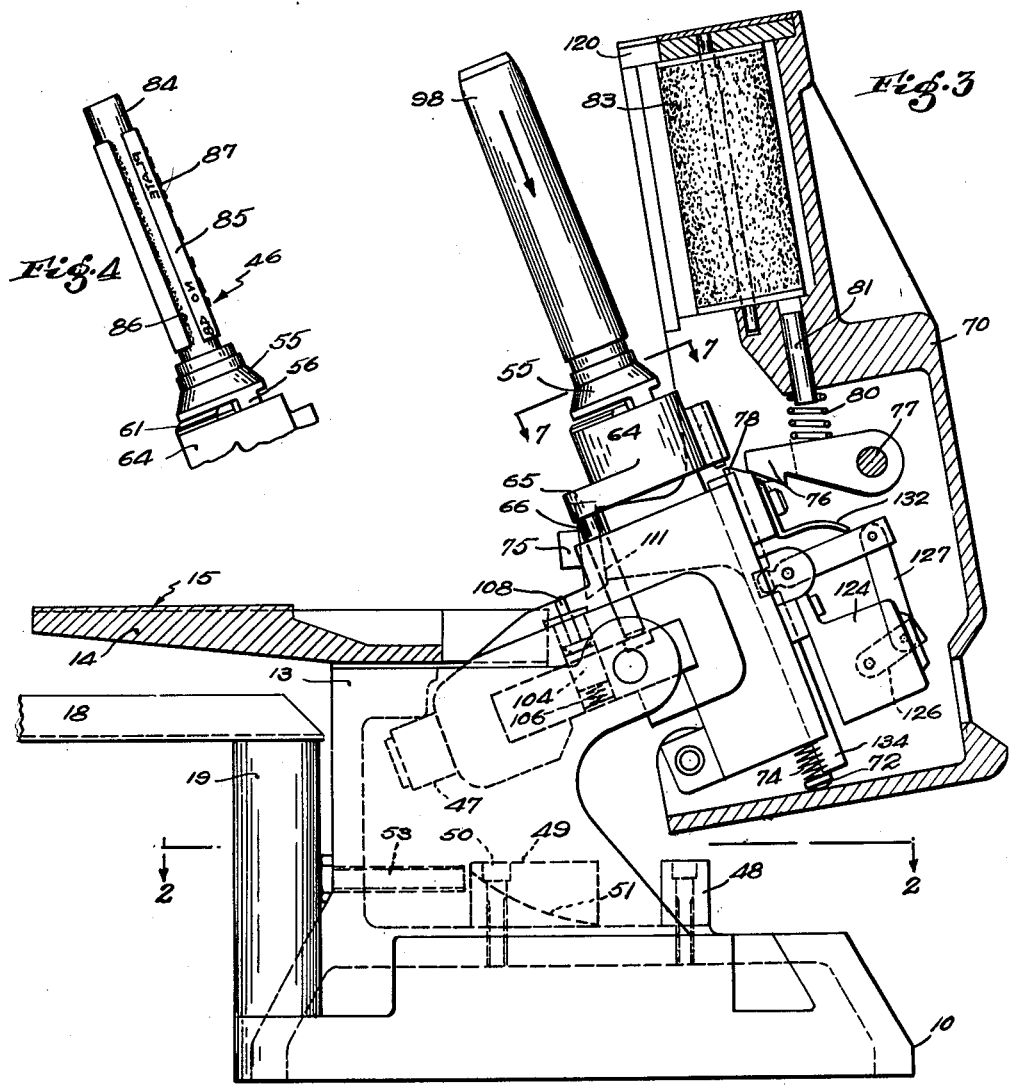
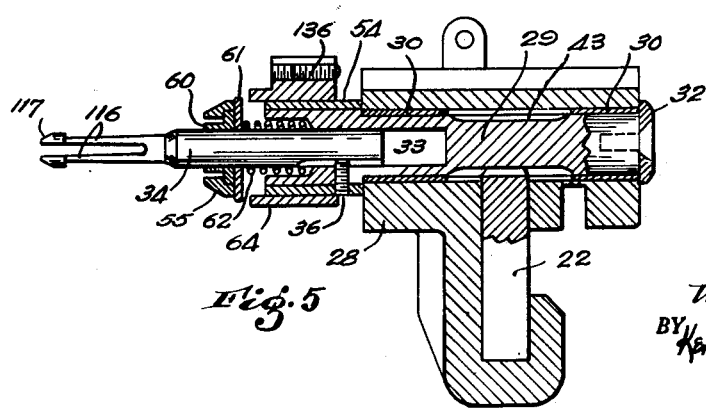
INVENTOR.
Walter P. Osgood

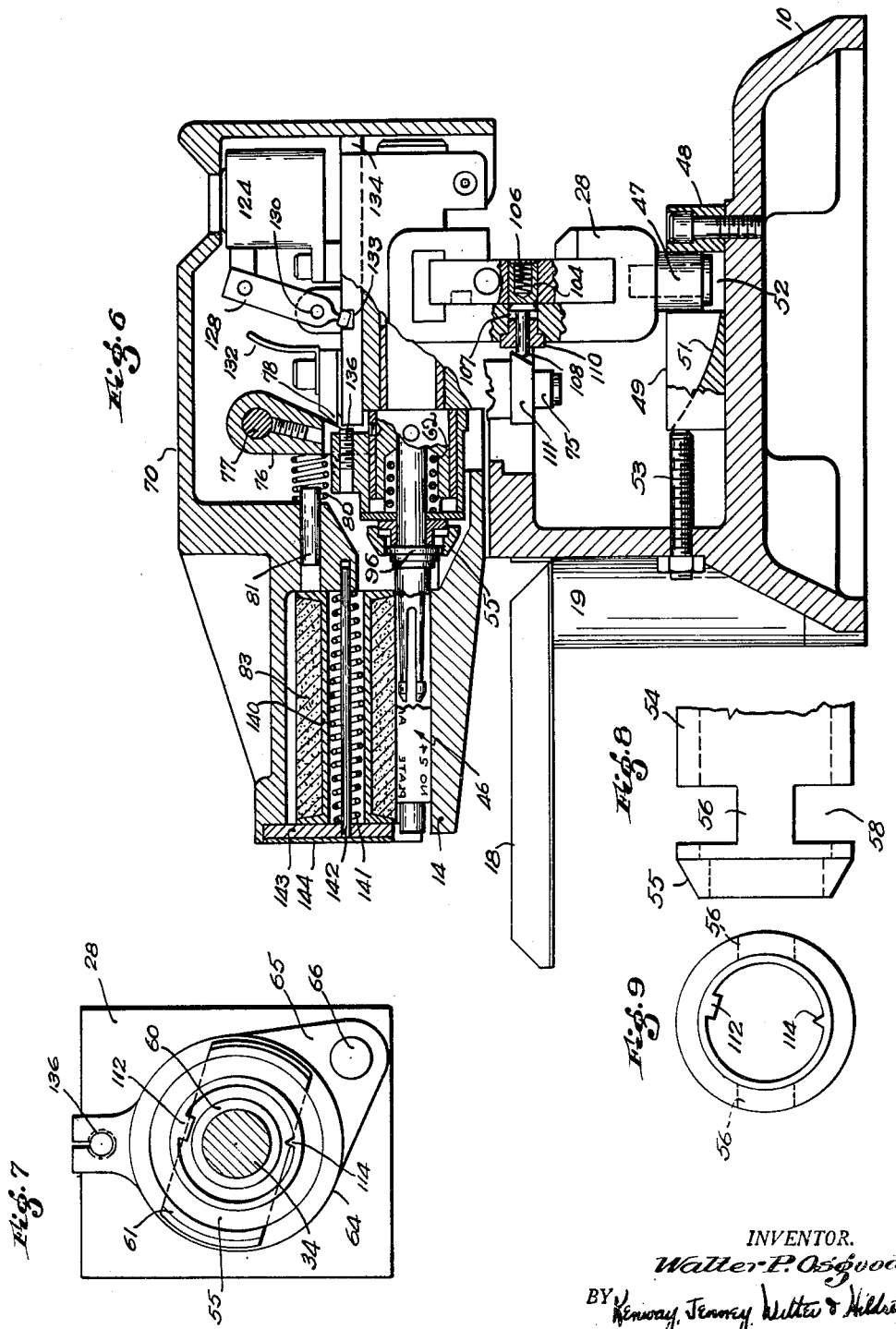

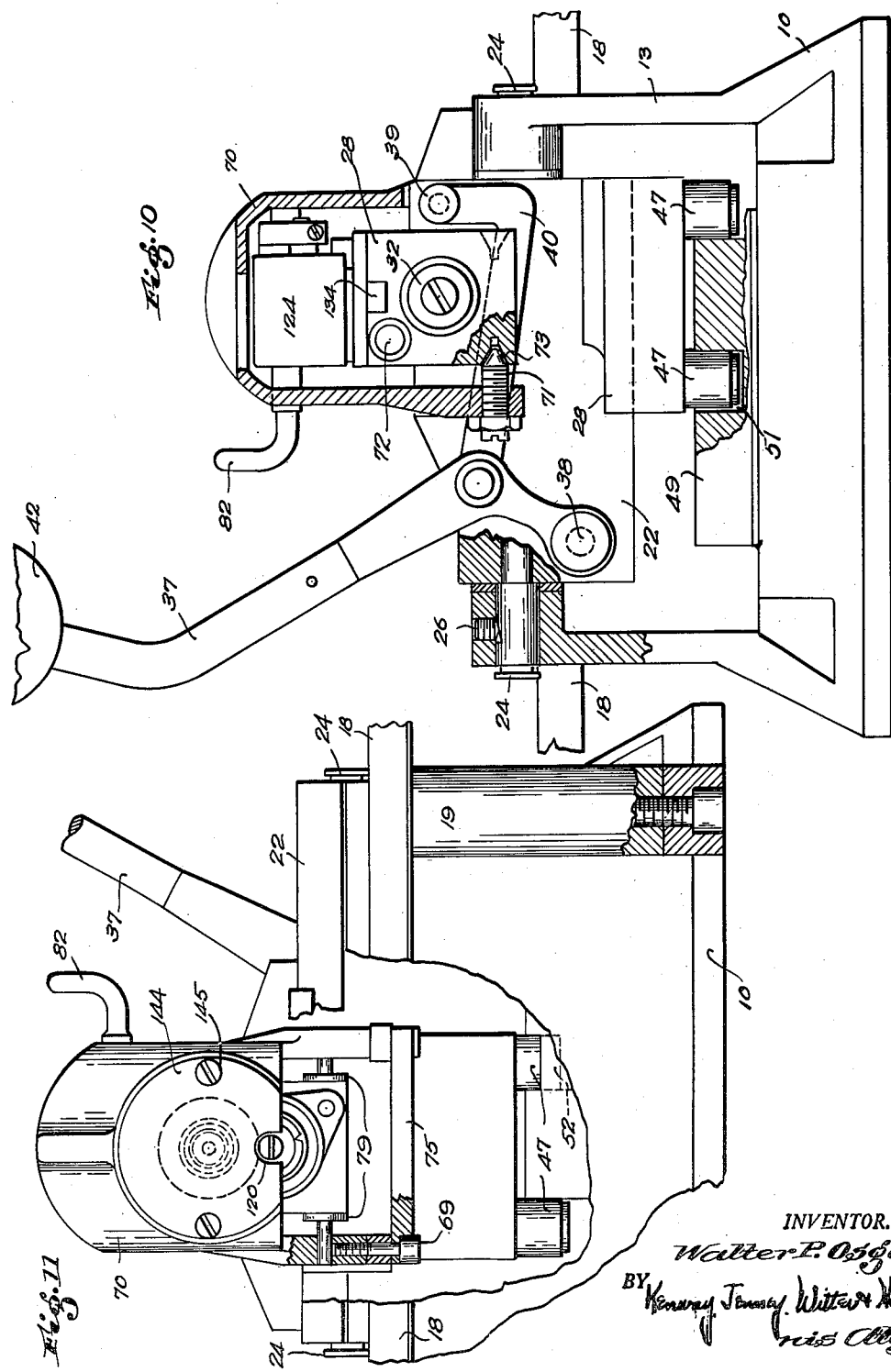

June 3, 1952 W. P. OSGOOD 2,599,278
SUPPORTING MEANS FOR ROLLER IDENTIFICATION DEVICES
Filed Oct. 29, 1947 6 Sheets-Sheet 5
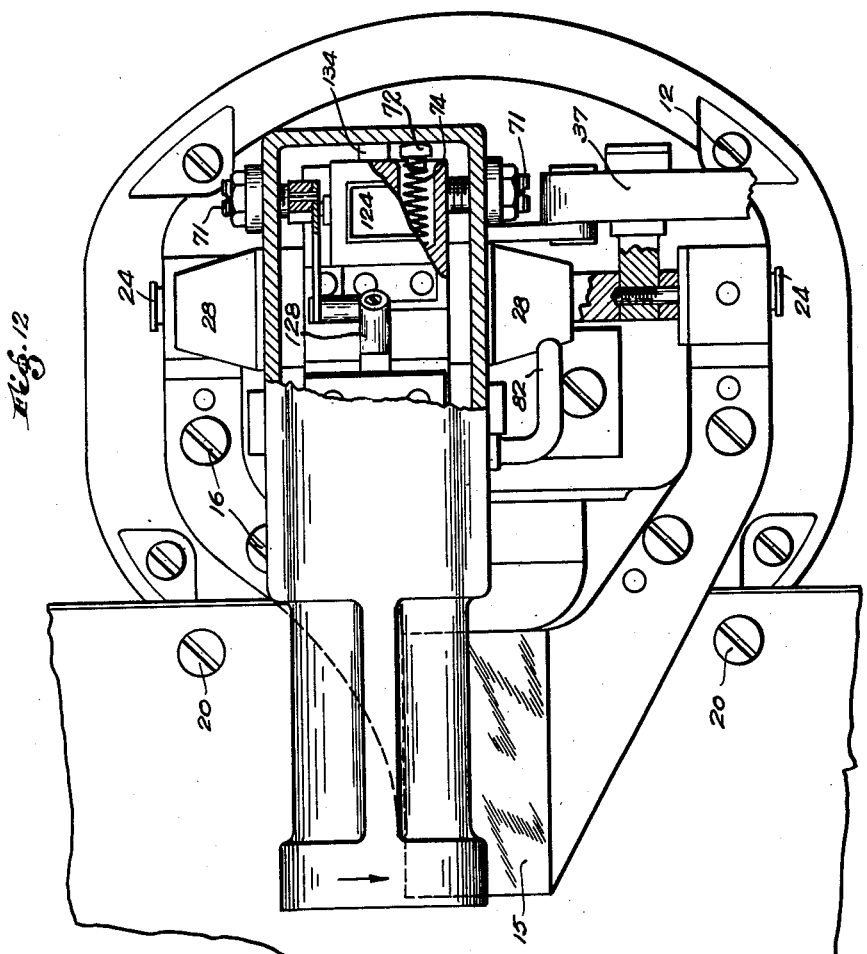
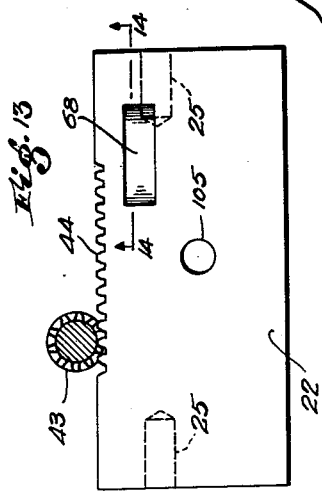
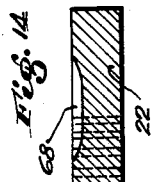
INVENTOR.
Walter P. Osgood.

June 3, 1952 W. P. OSGOOD 2,599,278
SUPPORTING MEANS FOR ROLLER IDENTIFICATION DEVICES
Filed Oct. 29, 1947 6 Sheets-Sheet 6
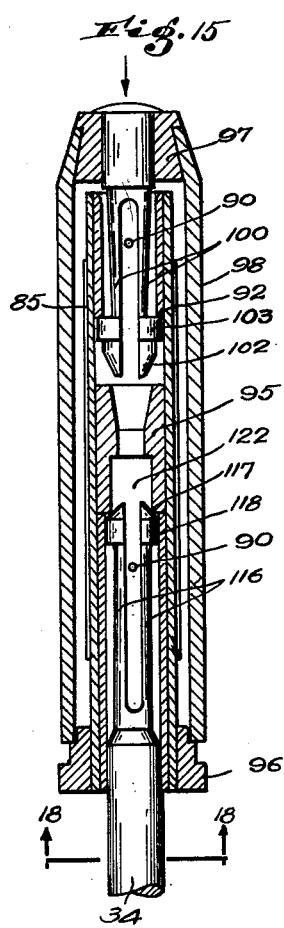
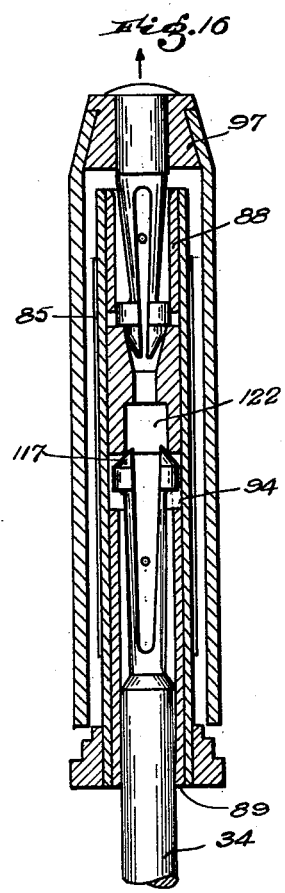
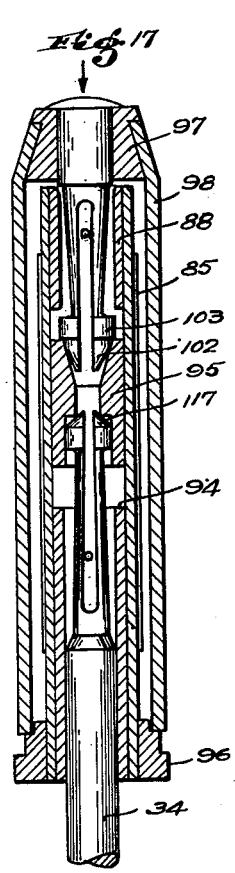
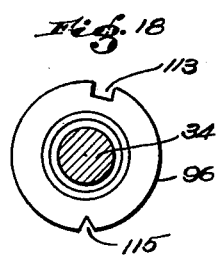
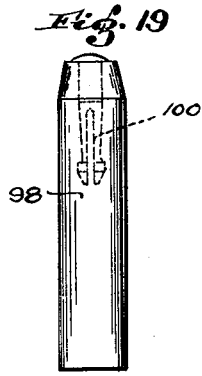
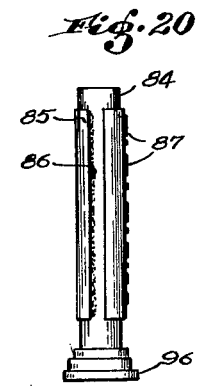
Inventor:
Walter P. Osgood
By Kenway, Jenney, Witter & Hildreth
his Attys.

Patented June 3, 1952

2,599,278

UNITED STATES PATENT OFFICE 2,599,278

SUPPORTING MEANS FOR ROLLER IDENTIFICATION DEVICES

Walter P. Osgood, Malden, Mass., assignor, by mesne assignments, to Authorite Company, Providence, R. I., a corporation of Rhode Island Application October 29, 1947, Serial No. 782,745

15 Claims. (Cl. 101—212)

This invention relates to mechanism for printing a name and other identification data on sales slips and the like, and more especially to a new and improved apparatus for receiving and printing from a novel printing roller described and claimed in my copending application Serial No. 782,746 filed October 29, 1947.

The printing unit disclosed in my said copending application comprises a printing member in the form of a roller disposed and locked within a protective casing for convenient and secret carrying by the person or customer to be identified. The invention herein embodies a new and improved recording machine for receiving the combined printing member and casing, releasing the casing which can thereupon be removed from and leave the member locked to the machine, utilizing the member thus locked to the machine to print the customer identification data, and thereafter automatically returning and locking the member in the casing and releasing it from the machine merely by reapplying the casing to the member, all without permitting access to the printing member independently of its locked association with the machine. The production of an improved machine for performing these functions comprises the primary object of the invention.

Preferably the improved machine employs a flat and horizontal printing platen and the printing member comprises a cylindrical roller. A head is mounted on the machine to travel along the platen and is provided with a spindle for receiving the printing roller. The head is also mounted for movement to and from (1) a printing position and (2) a remote position for applying and removing the printing roller, and automatically adjustable stop means is provided in association with the spindle for so predetermining the position of the casing and printing roller on the spindle that the roller is automatically attached to the spindle when the head is located at one end of its travel along the platen and is released therefrom and attached to the casing when the head is located at the other end of its travel. The production of mechanism for automatically performing these functions and for permitting movement of the head to and from said positions (1) and (2) only at the said ends of travel of the head comprises a further object of the invention.

A housing is also associated with the head and spindle and is movable on the head to two positions respectively (1) housing and supporting the printing roller in the printing operation and (2) disposing the spindle in a remote and independent position to permit convenient removal and replacement of the printing roller. Also associated with the head is a latch for permitting printing travel of the head only when the housing is disposed over and in supporting engagement with the roller. The production of a printing apparatus embodying these features comprises another object of the invention.

These and other features of the invention will be best understood and appreciated from the following description of a preferred embodiment thereof selected for purposes of illustration and shown in the accompanying drawings in which—

Fig. 1 is a perspective view of my improved machine in printing position,

Fig. 2 is a plan section taken on line 2—2 of Fig. 3,

Fig. 3 is a front elevation of the machine, partially in section and showing the housing and printing roller in non-printing position, Fig. 4 is a fragmentary view showing the printing roller on the spindle, Fig. 5 is a vertical sectional view through the spindle head, Fig. 6 is a front elevation of the machine, largely in vertical section and showing the housing and printing roller in printing position, Fig. 7 is a sectional view taken on line 7—7 of Fig. 3, Fig. 8 is a fragmentary side elevation of a sleeve cooperating with the spindle, Fig. 9 is a front end elevation of the sleeve, Fig. 10 is a fragmentary rear end view of the machine with the head in printing position, Fig. 11 is a fragmentary front end view, Fig. 12 is a plan view of Fig. 6, partially in section, Fig. 13 is an elevation of the printing head supporting block, Fig. 14 is a fragmentary sectional view taken on line 14—14 of Fig. 13, Fig. 15 is a longitudinal sectional view through the printing roller disposed on the spindle and locked within its protective casing, Fig. 16 is a like view showing the casing released and being withdrawn from the printing roller, Fig. 17 is a like view showing the casing being reapplied to the printing roller, Fig. 18 is a sectional view taken on line 18—18 of Fig. 15, Fig. 19 is an elevation of the casing, Fig. 20 is an elevation of the printing roller.

Referring to the drawings by reference characters, 10 indicates the base of the machine which may be secured to a support 11 by screws 12. A U-shaped pedestal 13 open at the rear of the machine is integral with and extends upwardly from the base. A platen 14 having a flat and horizontal top surface 15 is mounted on the pedestal and secured thereto by set screws 16. A shelf 18 for supporting a sales book 17 while the top sheets 21 are being printed on the platen is supported on posts 19 by screws 20 beneath the platen.

A rectangular block 22 is pivotally supported at its two ends on trunnions 24 mounted in the opposite side walls of the pedestal, the trunnions engaging within openings 25 in the block and being secured in the pedestal by set screws 26. A head 28 is slidably mounted on this block and is pivotally movable therewith to and from the two positions illustrated in Figs. 3 and 6. A spindle 29 is rotatably mounted in bearings 30 in the head and is secured therein by a cap 32 (Fig. 5). The forward end of the spindle is bored at 33 to receive a spindle 34 which is held non-rotatably therein by a set screw 36.

The head 28 is moved along the block 22 by a lever 37 pivoted to the block at 38 and connected to the head at 39 by a link 40, the lever having a hand knob 42 on its free end. Cooperating gear teeth 43 and 44 on the spindle 29 and block 22 serve to rotate the spindle as the head is moved along the block. The head is pivotally movable to and from the positions illustrated in Figs. 3 and 6. In the former position the spindle 34 is adapted to receive a printing roller 46 and in the latter position this roller is adapted to be traversed over the platen 14.

Mounted on two studs disposed within and projecting outwardly and downwardly from the bottom margin of the head 28 are two anti-friction rolls 47. Disposed below and cooperating with the rolls are two bars 48 and 49 secured to the base by screws 50. The two bars are spaced apart to provide a guideway 52 therebetween for receiving the anti-friction rolls and guiding the head along the platen in the printing position of Fig. 6. The bar 49 is recessed transversely at 51 intermediately of its ends (Fig. 2) and the two portions at opposite sides of the recess are of a width corresponding to the spacing of the two rolls 47, as illustrated in Fig. 10. A backing screw 53 is provided for giving firm support to the bar 49. The arrangement is such that when the head is in either of its extreme positions at the ends of the block 22, the block and head can be pivoted to and from the said positions illustrated in Figs. 3 and 6, the guideway 52 serving to hold the head in printing position during travel of the printing roller over the platen.

The spindle 29 is held in the head by and between the cap 32 at the rear end of the spindle and a sleeve 54 secured by the set screw 36 to the forward end of the spindle 29. The front end of the sleeve 54 terminates in a tapered head 55 integrally connected with the sleeve by oppositely disposed portions 56, the intermediate portions of the sleeve being cut away at 58. A bushing 60 is mounted to slide freely on the spindle 34 within the head 55 and a disc 61 is mounted on the spindle rearwardly of the bushing. A compression spring 62 on the spindle normally forces the disc and bushing forwardly into contact with the head as illustrated in Fig. 5. The disc 61 is of rectangular shape (Fig. 7) and extends outwardly through the openings 58 and is of a length to overlap the outer end of a member 64 freely slidable on the sleeve 54, the member serving as a stop to rearward movement of the bushing 60 and disc 61 against the spring 62.

Extending laterally outward from the member 64 is an integral arm 65 carrying a pin 66 extending inwardly of the head 28 to end contact with the block 22 (Fig. 3), the block thus acting as a stop limit for rearward movement of the pin and member 64. The path of movement of the pin along the block includes a depression 68 formed in the block and this depression permits the member and pin to move rearwardly a predetermined amount for a purpose hereinafter described.

A housing 70 is pivotally mounted on the head 28 by trunnion screws 71 threaded into the rear bottom corners of the housing and engaging in bores 73 formed in the head. A plunger 72 and compression spring 74 carried by the head and operative against the housing normally pivots the housing backwardly on the head to the position of Fig. 3, in which movement the housing is limited by a yoke depending from the housing and including a bar 75 disposed beneath and engaging a forward portion of the head (Fig. 11). The housing is held in centered position on the head by two elements 79 secured in the housing by screws 69 and engaging opposite sides of the head. A latch 76 carried on a shaft 77 in the head is adapted to engage a shoulder 78 and hold the housing in closed position over the head, a spring 80 supported on a pin 81 in the housing normally holding the latch in engaged position. The shaft terminates in a handle 82 by which the latch can be released. The housing carries an inking roll 83 in its free end.

The printing roller employed in the machine and disclosed and claimed in my copending application Ser. No. 782,746 filed October 29, 1947, comprises a cylindrical tube 84 having a sheet 85 of soft metal wrapped tightly thereonto and secured as by solder along one margin 86. The sheet has type 87 impressed thereinto and extending outwardly from its outer face. Bushings 88 and 89 are mounted within the two ends of the tube and secured by cross pins 90. The inner ends of the tube bushings provide annular shoulders 92 and 94 in spaced relation within the tube and a sleeve 95 is mounted to slide freely within the tube between these shoulders. A collar 96 is mounted on one end of the tube.

When not in use the printing roller is carried in a tubular protective casing 98 open at one end and having a closure 97 at its other end including a pair of resilient fingers 100 extending axially into the casing. The extreme inner ends of the fingers are tapered at 102 and outwardly projecting shoulders 103 are provided on the fingers rearwardly of such ends for cooperating with the shoulders 92 of the printing roller. The arrangement is such that when the casing is disposed over the roller to the position illustrated in Fig. 15 the shoulders 103 engage the shoulders 92 and lock the roller within the casing.

The printing roller is adapted to be disposed over and connected to the spindle 34 in the position illustrated in Fig. 4 and when the roller is to be applied to or removed from the spindle the head and housing are tipped rearwardly to the position of Fig. 3. The printing roller is applied to the spindle while the head in the loading position at the rear end (Fig. 10) of its travel on the block 22, the printing is performed during travel of the head forwardly toward the lever 37

(see arrow Fig. 12), and the printing roller is removed while the head is located at the forward end of its travel. When the head is tipped rearwardly, the latch 76 is released by the handle 82 and the housing permitted to tip backwardly to the position of Fig. 3, thereby rendering the spindle conveniently accessible.

The normal position of the head 28 on the block 22 is the loading position illustrated in Fig. 3 and in this position the head is latched to the block by a detent 104 mounted in a bore 105 in the block and moved by a spring 106 into a cooperating bore 107 in the head. A releasing pin 108 is carried by a bushing 110 in the bore and cooperating with the outer end of the pin is a cam 111 carried by the bar 75 of the housing. The arrangement is such that movement of the housing to the latched position of Fig. 6 automatically releases the detent 104 from the bore 107. The function of the detent is to prevent printing movement of the head along the platen until the housing has been returned to proper printing position on the head.

With the head 28 in the loading position (Fig. 3), the printing roller is applied as follows. The patron whose name and identification are to be printed, hands his encased printing unit to the clerk who thereupon applies the unit to the spindle 34 as illustrated in Figs. 15 and 16. The opening in the collar 96 end of the unit is of a size to pass over the larger diameter of the spindle and within the opening in the forward end portion 55 and abut against the bushing 60. It will be noted that two inwardly projecting lugs 112 and 114 are carried by the tapered end portion 55 of the spindle and the collar 36 is recessed at 113 and 115 to fit these lugs. Thus the unit serves the function of a key and can be applied only to authorized machines in which the lugs correspond to the recesses 113 and 115. It will be apparent that this arrangement prevents use of the unit on machines other than those for which it is constructed and authorized.

The unit is forced against the bushing 60 to the full extent permitted by contact of the disc 61 with the member 64, the member being held in its outermost position (Fig. 3) by contact of its pin 66 with the face of the block 22. This position is such as to force the sleeve 95 onto the tapered ends 102 of the fingers 100 (Fig. 16) and compress the fingers sufficiently to release their shoulders 103 from the shoulders 92. The free end of the spindle 34 comprises two resilient fingers 116 tapered at their ends 117 and provided with shoulders 118 rearwardly thereof. In the position illustrated in Fig. 16 the shoulders 118 are adapted to engage the shoulders 94 and thus connect the spindle to the printing roller. With the parts in such position the casing 98 is withdrawn, leaving the printing roller connected to the spindle as illustrated in Fig. 4.

The head 28 is then tipped downwardly to the printing position of Fig. 6 and the housing is likewise moved to its latched position on the head. In this position the inking roll 83 is in contact with the printing roller and the open forward portion 120 of the housing provides clearance for the free end of the printing roller. Movement of the housing to latched position causes its cam 111 to release the detent 104 (Fig. 6) thereby permitting movement of the head on the block 22. The lever 37 is then pivoted forwardly moving the head forwardly and rolling the printing roller over the platen and printing its type onto the sheets on the platen including such carbon copies as are required. The portion of the book not being printed is supported on the shelf 18. If further copies are desired the printing operation can be repeated as many times as necessary.

The printing roller is removed as follows. At the end of the printing operation, with the head in its forward position and the pin 66 engaged within the depression 68, the head is tipped rearwardly and the housing latch 76 released. The casing 98 is then applied to the printing roller on the spindle and pressed against the bushing 60 to the full extent permitted by contact of the disc 61 with the member 64, this position being lower than that previously described due to engagement of the pin 66 in the depression 68. In such position (Fig. 17) the spindle fingers 116 enter and frictionally engage the walls of a recess 122 in the sleeve 95, thus disposing the shoulders 118 inwardly of the shoulders 94 and frictionally connecting the spindle to the sleeve 95. The frictional contact between the spindle and the sleeve 95 causes the sleeve to pull away from the fingers 100, when the casing 98 is drawn outwardly, which thereupon reengage at 103 with the shoulders 92 and lock the roller within the casing, and the engagement of the fingers 116 within the recess 122 prevents engagement thereof with the shoulders 94. Outward movement of the casing thus causes the combined casing and printing roller to be removed from the spindle. It will be noted that the taper 117 is substantially steeper than the taper 102 on the fingers 100 and furthermore the spindle fingers are substantially stiffer, thereby causing relatively greater frictional contact between the spindle fingers and the sleeve 95.

A counter 124 is provided on the housing for totaling the number of printing operations performed by the machine. An arm 126 fixed on the counter shaft is connected by a link 127 to a lever 128 pivoted to the head at 130. Forward movement of the lever is limited by a stop 132. The bottom end of the lever engages within a notch 133 in a bar 134 slidably mounted in the head. Forward sliding movement of the bar is limited by a screw 136 threaded into the member 64. The bar is held between the housing and the screw 136 when the housing is closed (Fig. 6) and is moved rearwardly by rearward movement of the member 64 when its pin 66 passes into the depression 68. The construction automatically registers one unit at each rearward movement of the bar, thus recording each removal of a printing roller.

The inking roll 83 includes an inner tubular core 140 supported on a spiral spring 141 disposed about a supporting rod 142 supported at its forward end in an end plate 143. A cap 144 and screws 145 are provided for securing the end plate in place. The spring 141 is larger at its mid-portion whereby the inking roll can automatically accommodate itself to the printing roller 46.

It is believed that the construction, operation and advantages of my improved printing machine will now be apparent. The casing 98 provides a protective and secret carrier for the printing roller and the novel construction illustrated and described provides automatically for applying the printing roller to the spindle and releasing it therefrom for use, all without permitting independent detachment of the roller from the casing and, except for its period of use, the roller is always securely and secretly housed within the casing.

When the printing roller 46 is in printing position on the spindle 34 the engagement of the spindle shoulders 118 with the shoulder 94 maintains the printing roller on the spindle with the spring 62 held under compression, as illustrated in Fig. 6. When the casing 98 is reapplied to the printing roller and pressed to the innermost position permitted by the depression 68 the shoulders 118 are released from the shoulders 94 and the spring 62 moves the printing roller outwardly to the position illustrated in Fig. 15 and the casing shoulders 103 engage the printing roller shoulder 85. The combined casing and printing roller can then be withdrawn as a unit.

Having thus disclosed my invention, what I claim as new and desire to secure by Letters Patent is:

1. A printing apparatus comprising a base, a flat and substantially horizontal platen on the base, a rectangular guide block disposed parallel with the platen, coaxial means supporting the block at its ends on the base for pivotal movement about a substantially horizontal axis extending longitudinally of the block, a head mounted non-rotatably on and slidable along the block and carrying a spindle for receiving and supporting a printing roller, means for effecting movement of the head along the block, and means including a pinion on the spindle and cooperating rack teeth on the block for rotating the spindle, the block and head being pivotally movable about said axis to and from two positions in one of which the spindle and roller are disposed horizontally in printing position over the platen and in the other of which the spindle and roller project upwardly remotely from the platen.

2. The apparatus defined in claim 1 plus means for holding the block and head in said one position during printing movement over the platen but permitting pivotal movement thereof about said axis to said other position at the two ends of travel over the platen.

3. A printing apparatus comprising a base, a substantially horizontal platen on the base, a head, a spindle carried by the head and having a free end portion projecting outwardly therefrom and adapted to receive and support a printing roller, means pivotally mounting the head on the base for movement to and from two positions in one of which the spindle and roller are disposed horizontally in printing position over the platen and in the other of which the spindle and roller project upwardly remotely from the platen, means for supporting and guiding the head for movement parallel with the platen, means for effecting such movement, means for rotating the spindle during such movement, a housing carried by the head and projecting outwardly therefrom along the spindle and having a free end portion for receiving and supporting the free end of the printing roller, and means supporting the housing on the head for movement relative thereto to and from two positions in one of which the housing encloses the printing roller and supports its outer free end in printing position and in the other of which the housing is disengaged from the printing roller and disposed remotely therefrom.

4. The apparatus defined in claim 3 in which the housing is pivoted at its rear end to the head for movement to and from said two positions, the housing being parallel with the spindle and roller in said one position and diverging therefrom outwardly in said other position.

5. The apparatus defined in claim 3 plus a releasable latch for retaining the housing in said one position.

6. The apparatus defined in claim 3 plus a latch for preventing said movement of the head parallel with the platen when the housing is in said remotely disposed position, and means for automatically releasing the latch when the housing is moved to said one position.

7. Apparatus for identifying customers and recording identifying indicia comprising, in combination, a recording machine embodying a base, a flat platen on the base, a head mounted on the base for straight line movement along and relative to the platen, a spindle carried by the head, a member having raised printing type on one surface, a casing enclosing the member, inaccessible locking means within the casing for locking the member in the casing, means for releasing said locking means and connecting the member to the spindle when the combined member and casing are applied to a predetermined position on the spindle and for disengaging the member and spindle and reestablishing the locking engagement between the member and casing when the combined member and casing are applied to another predetermined position on the spindle, and means automatically and respectively establishing said predetermined positions when the head is in two positions of its said movement.

8. The apparatus defined in claim 7 in which the last named means comprises a movable stop associated with the spindle and means for automatically setting the stop to two different levels respectively when the head is in said two positions.

9. The apparatus defined in claim 7 in which said member is a printing roller and said head is mounted to traverse and rotate the printing roller over the platen, and in which said two predetermined positions are automatically established when the head is located respectively at the two ends of its platen travel.

10. Apparatus for identifying customers and recording identifying indicia comprising, in combination, a recording machine, a spindle supported at one end on the machine and having a free end extending outwardly therefrom, a member having raised printing type on one surface, a casing having an opening for receiving the member thereinto, means within the casing and inaccessible from the outside thereof for locking the member in the casing, lock releasing means slidably carried by the member, the casing with the member therein being adapted to slide telescopically over and receive the spindle axially thereinto and into engagement with the lock releasing means, a stop carried by the machine in the path of movement of the casing at said one end of the spindle, sliding movement of the lock releasing means by engagement of the spindle therewith being adapted to release the member from the casing when the casing is moved into engagement with said stop, and means carried by the spindle for connecting it with the member, the casing being thereupon removable from the combined member and spindle in a direction away from the stop.

11. Apparatus for identifying customers and recording identifying indicia comprising in combination a recording machine at the place where the customer is to be identified, a secret identification token adapted to be carried by the customer and used in the machine, said identification token comprising a recording element, a detachable tubular casing enclosing the recording element, means including locking shoulders disposed inaccessibly within the casing between and remote from the two ends thereof for locking said element therein, means including a locking shoulder within the casing between and remote from the two ends thereof for connecting the recording element in operative position to the machine when the token is applied thereto, and means including a cam carried by the recording element and cooperating means on the machine for automatically disengaging said locking shoulders when the casing with the recording element locked therein is applied in predetermined position to the machine.

12. The apparatus defined in claim 11 plus means including a variable stop carried by the machine for automatically releasing the machine from said shoulder and re-establishing the locking engagement of said locking shoulders when the casing is re-applied to the recording element in the machine to a position permitted by the stop.

13. Apparatus for identifying customers and recording identifying indicia comprising in combination a recording machine at the place where the customer is to be identified, a secret identification token adapted to be carried by the customer and used in the machine, said identification token comprising a recording element, a detachable tubular casing enclosing the recording element, means including locking shoulders disposed inaccessibly within the casing between and remote from the two ends thereof for locking the element therein, means including a locking shoulder within the casing between and remote from the two ends thereof for connecting the recording element in operative position to the machine when the token is applied thereto, and cooperating means including a stop carried by the machine and a cam carried by the recording element for automatically disengaging said locking shoulders when the casing with the recording element locked therein is applied in predetermined position to the machine and including means for varying the position of said stop and automatically releasing the machine from said shoulder and re-establishing the locking engagement of said locking shoulders when the casing is re-applied to the recording element in the machine to a position permitted by the stop.

14. The apparatus defined in claim 10 plus means for changing the predetermined position of said stop, and means for re-establishing the locking engagement of the member in and to the casing and releasing said connection of the spindle with the member when the casing is reapplied to the combined member and spindle and pressed thereonto against the stop in its changed position.

15. The apparatus defined in claim 14 plus a printing platen cooperating with said member, and means carried by the machine for automatically disposing said stop in the first named position and said changed position respectively when the spindle is moved to two different positions relative to the platen.

WALTER P. OSGOOD.

REFERENCES CITED

The following references are of record in the file of this patent:

UNITED STATES PATENTS

| Number | Name | Date |
|---|---|---|
| 2,099,679 | Davis | Nov. 23, 1937 |
| 2,204,577 | Davis | June 18, 1940 |